US010268269B2

(12) United States Patent
Chan

(10) Patent No.: US 10,268,269 B2
(45) Date of Patent: Apr. 23, 2019

(54) GLOVE FOR USE WITH TOUCH INTERFACE DEVICES

(71) Applicant: Timothy Chan, New York, NY (US)

(72) Inventor: Timothy Chan, New York, NY (US)

(*) Notice: Subject to any disclaimer, the term of this patent is extended or adjusted under 35 U.S.C. 154(b) by 818 days.

(21) Appl. No.: 14/051,980

(22) Filed: Oct. 11, 2013

(65) Prior Publication Data

US 2015/0101104 A1    Apr. 16, 2015

(51) Int. Cl.
  *G06F 3/00* (2006.01)
  *G06F 3/01* (2006.01)
  *A41D 19/00* (2006.01)

(52) U.S. Cl.
  CPC ......... *G06F 3/014* (2013.01); *A41D 19/0017* (2013.01)

(58) Field of Classification Search
  CPC ............ A41D 19/0006; A41D 19/0013; A41D 19/0017; A41D 19/0068; A41D 19/01588; A41D 13/085; A41D 13/087
  See application file for complete search history.

(56) References Cited

U.S. PATENT DOCUMENTS

| | | | |
|---|---|---|---|
| 474,929 A | 5/1892 | Tabor | |
| 709,595 A | 9/1902 | Carson | |
| 1,275,837 A | 8/1918 | Biggs | |
| 1,329,996 A | 2/1920 | Pacifico | |
| 1,337,879 A | 4/1920 | Bean | |
| 1,358,824 A * | 11/1920 | Burden | 2/163 |
| 1,400,655 A * | 12/1921 | Bohnert | 2/158 |
| 1,620,434 A | 3/1927 | Burden | |
| 1,673,517 A | 6/1928 | Kurz | |
| 1,680,592 A | 8/1928 | Chiles | |
| 2,118,463 A | 5/1938 | Eden | |
| 2,128,796 A | 8/1938 | Bohm-Myro | |
| 2,253,710 A * | 8/1941 | Jones et al. | 2/163 |
| 2,274,335 A | 2/1942 | Kennedy | |
| 3,098,237 A | 7/1963 | Slimovitz | |
| 3,299,441 A | 1/1967 | Slimovitz | |
| 3,608,093 A | 9/1971 | Kirby | |
| 4,651,350 A | 3/1987 | Dawiedczyk | |
| 4,704,743 A | 11/1987 | Thornell | |
| 4,712,253 A * | 12/1987 | Chen | 2/161.8 |
| 5,444,874 A | 8/1995 | Samelian | |
| 5,548,844 A * | 8/1996 | Ceresia | 2/161.7 |
| 5,680,654 A | 10/1997 | McClanahan | |
| 5,687,424 A | 11/1997 | Masley | |
| 5,924,137 A * | 7/1999 | Gold | 2/161.1 |
| 6,338,163 B1 | 1/2002 | Markson | |
| 6,584,615 B1 * | 7/2003 | Wilder et al. | 2/16 |
| 6,810,530 B2 | 11/2004 | Bryant | |
| 7,874,021 B2 | 1/2011 | Sunder | |
| 8,505,115 B2 | 8/2013 | Matsuoka | |
| 2004/0064870 A1 * | 4/2004 | Gold | 2/158 |
| 2004/0111785 A1 * | 6/2004 | Sande | 2/161.1 |
| 2005/0132467 A1 * | 6/2005 | Tippey | 2/159 |
| 2013/0212775 A1 * | 8/2013 | Kusjanovic | 2/164 |

* cited by examiner

*Primary Examiner* — Khaled Annis

(57) ABSTRACT

The present invention is directed to a glove system comprising a plurality of closed tip finger sheath with a secondary finger sheath disposed near the finger tips to allow for improved interaction with a portable electronic devices.

2 Claims, 9 Drawing Sheets

GLOVE FOR USE WITH TOUCH INTERFACE DEVICES

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

The invention relates to a glove system that may be used with a touch interfaces electronic device.

Portable electronic devices such as tablet and smart phones have become integral part of many people's daily lives. Many users are dependent on their phones to connect with friends, family and work and use their phones wherever they are. Neither cold nor snow nor rain nor sleet shall keep them from their appointed connections. Many portable electronic devices utilize touch interfaces for input instead of pressure sensitive interfaces and require the user's finger to interact with the device, so in cold weather the user's glove/mitten, or other protective clothing may interfere with interaction with the user's devices.

Gloves have been around for hundreds of years and there are hundreds of ways to make them, and NASA has even spent millions on constructing one for space use. However there is still no glove which allows for the dexterity required to interact efficiently with current day touch electronic devices. Accordingly there is a need for a better glove system to allow improved user interaction with such touch interfaces devices, while remaining minimally obtrusive and fashionable.

SUMMARY OF THE INVENTION

The present invention is directed to a glove system comprising a plurality of closed end finger sheath with a secondary finger sheath disposed near the finger tips to allow for improved interaction with a touch interface electronic devices. The glove can be made from any fabric, animal hides, or knitted.

DETAILED DESCRIPTION

Figure 1:
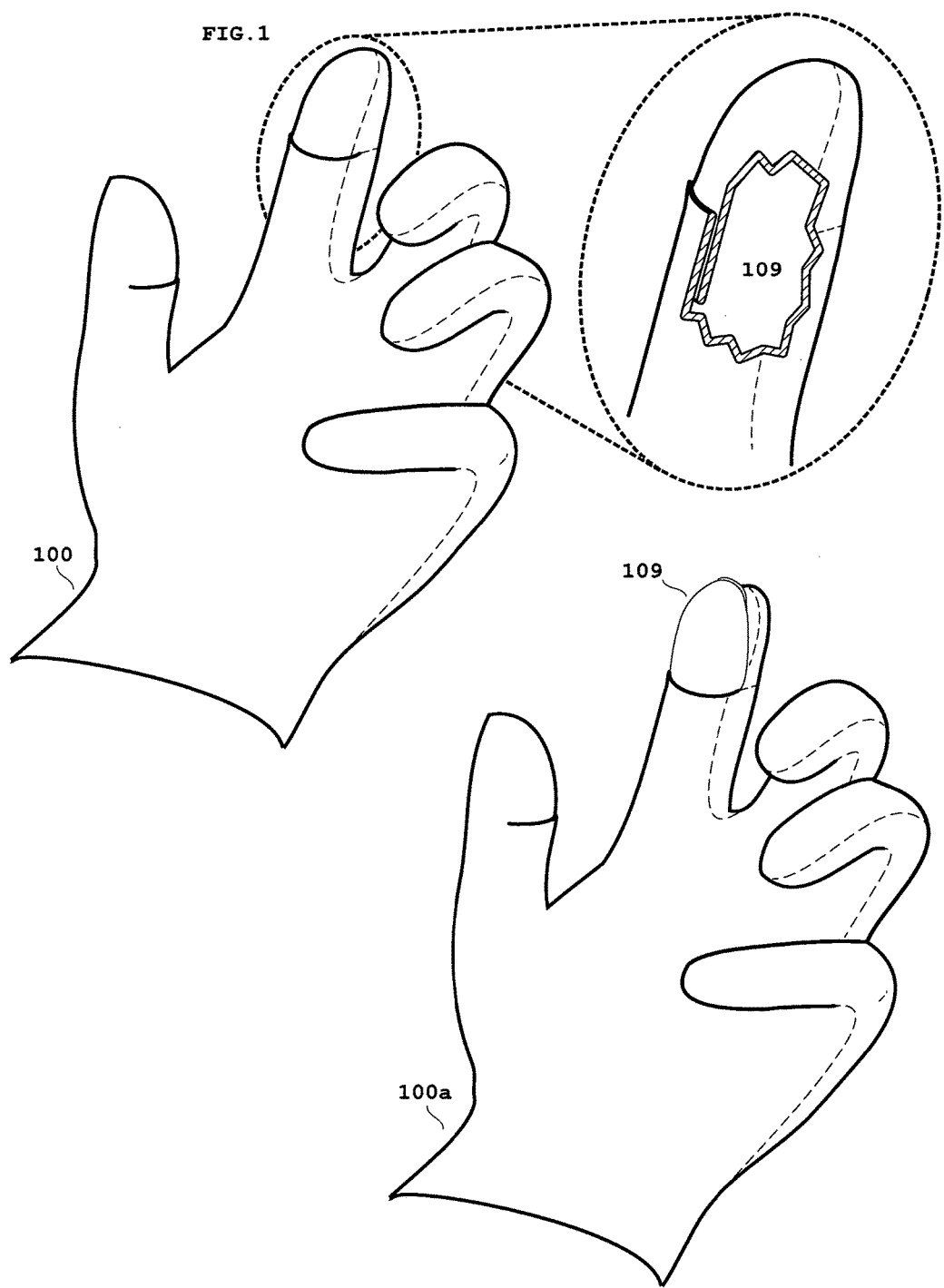
FIG. 1 is an isometric view of one embodiment of the invention and its use with an exploded view, showing a cut out cross section of one embodiment

FIG. 1 is a illustration of how one embodiment of the present invention is worn. Glove 100 covers the user's hand. Glove 100a show the same glove with the user's finger tip 109 extended outside of the glove.

Figure 2:
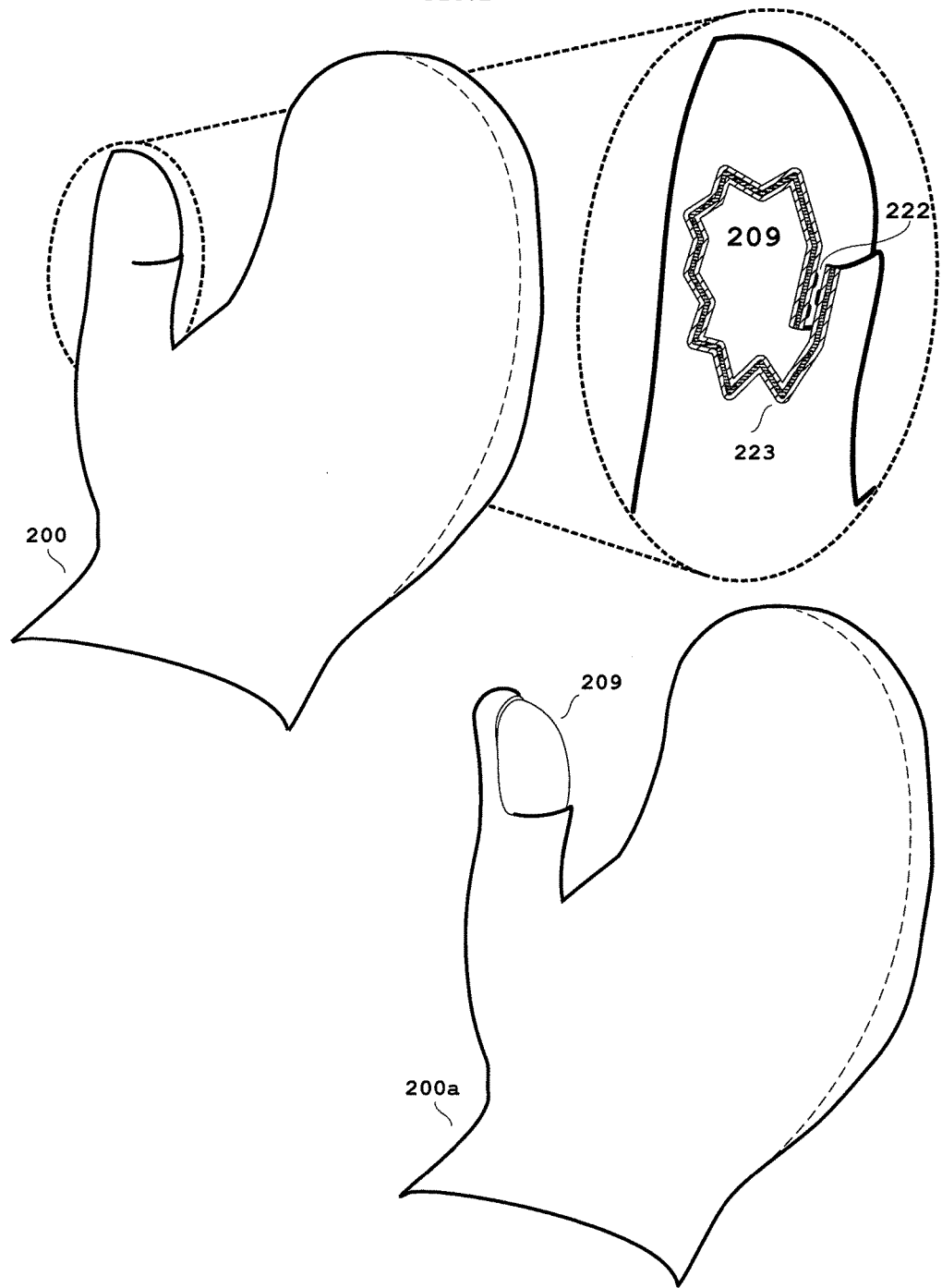
FIG. 2 is an isometric view of an alternate embodiment of the invention and its use with an exploded view, showing a cut out cross section of alternate embodiment

FIG. 2 is a illustration of how an alternate embodiment of the present invention is worn. Glove 200 covers the user's hand. Glove 200a show the same glove with the user's finger tip 209 extended outside of the glove whereby the open ended sheath is distend by user's finger.

FIG. 3 to FIG. 8 are each complete sets of patterns that can be used to manufacture several embodiments of the present invention. Anyone skill in the art will be able to scale the patterns up and grade them to size and cut the piece out of the desired material (fabric, animal hides, or other flexible material) and sew together the piece to construct the gloves. Only one side for each glove pattern is shown, so in order to create a pair anyone skill in the art would simply lay the material face to face when cutting to cut both the left and right hands at the same time. There are many other possible glove patterns, too many to include as gloves have been around for hundreds of years.

A brief explanation of the pattern notation. The solid black lines represent cutting lines the ⅛ seam allowances stitch lines has been left off of all the patterns to improve readability. The pattern notches are represented by a single alpha letter that can be used to match up the pattern pieces. The dash lines represent optimal stitch locations. The dotted cross hatch represent how one pattern piece should be oriented in relation to another pattern piece. Grain lines have also been left off of all the patterns to improve readability.

Figure 3:
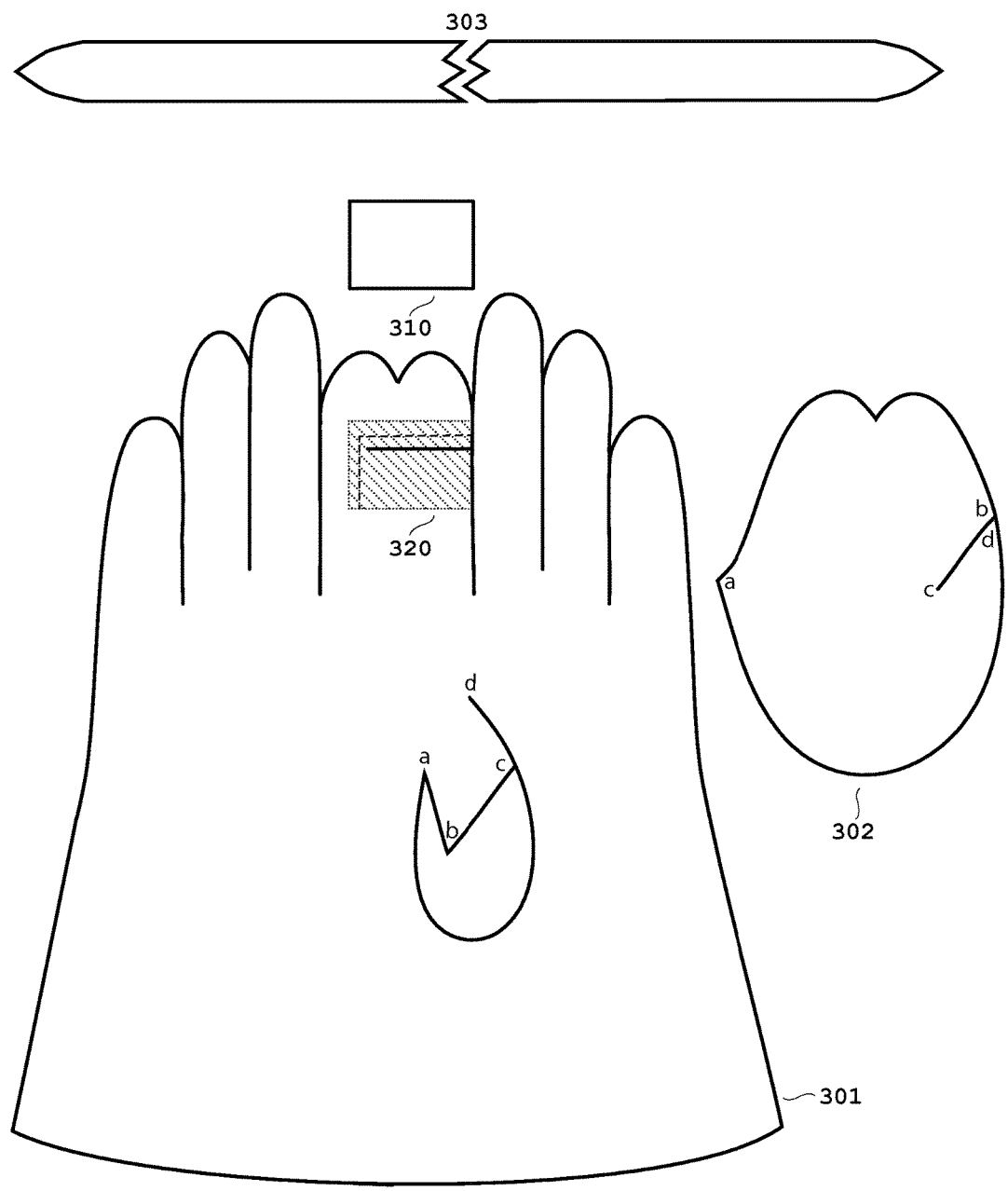
FIG. 3 is an actual glove pattern scaled to fit in page that can be used to construct one embodiment of the invention

FIG. 3 shows a glove pattern with 5 closed-end finger sheaths and a secondary unclosed-end finger sheath formed with pattern piece 310. Pattern piece 310 is attached in the position indicated by the dotted cross hatch area 320 on pattern piece 301. Pattern piece 310 is to be place on the internal face of pattern piece 301 then stitched and/or glued with adhesive as indicated by the dash line within the dotted cross hatch area 320, then the remaining parts can be assemble together noting the notches. The pattern piece 302 is the thumb sheath and is attached to the thumb opening of pattern piece 301. The pattern piece strip 303 has been truncated to fit on page, the actual length of the strip 303 must be sufficient to cover the perimeter of the 3 cuts between adjacent fingers and 3 finger tips. The pattern piece 310 in the finished glove forms an overlap section with pattern piece 301 which reinforces and solves the problem of tearing and stress on the opening in the finger sheath as the finger is tugged at its tip during normal everyday wearing and removal. In this embodiment the passage opens outward towards the finger tip to reduce the chances of snagging and catching, as getting your clothing caught on a taxi cab door handle can be very hazardous. Some extra allowance in the finger sheath length can be added dependent upon the stretch of the material. Furthermore it is possible to create a seal between the overlap section by adding lips/ridges denoted by 222 in FIG. 2 (parallel to the cut in the finger of pattern piece 301) to inner surface faces that then fit together to form a temporary seal.

Figure 4:
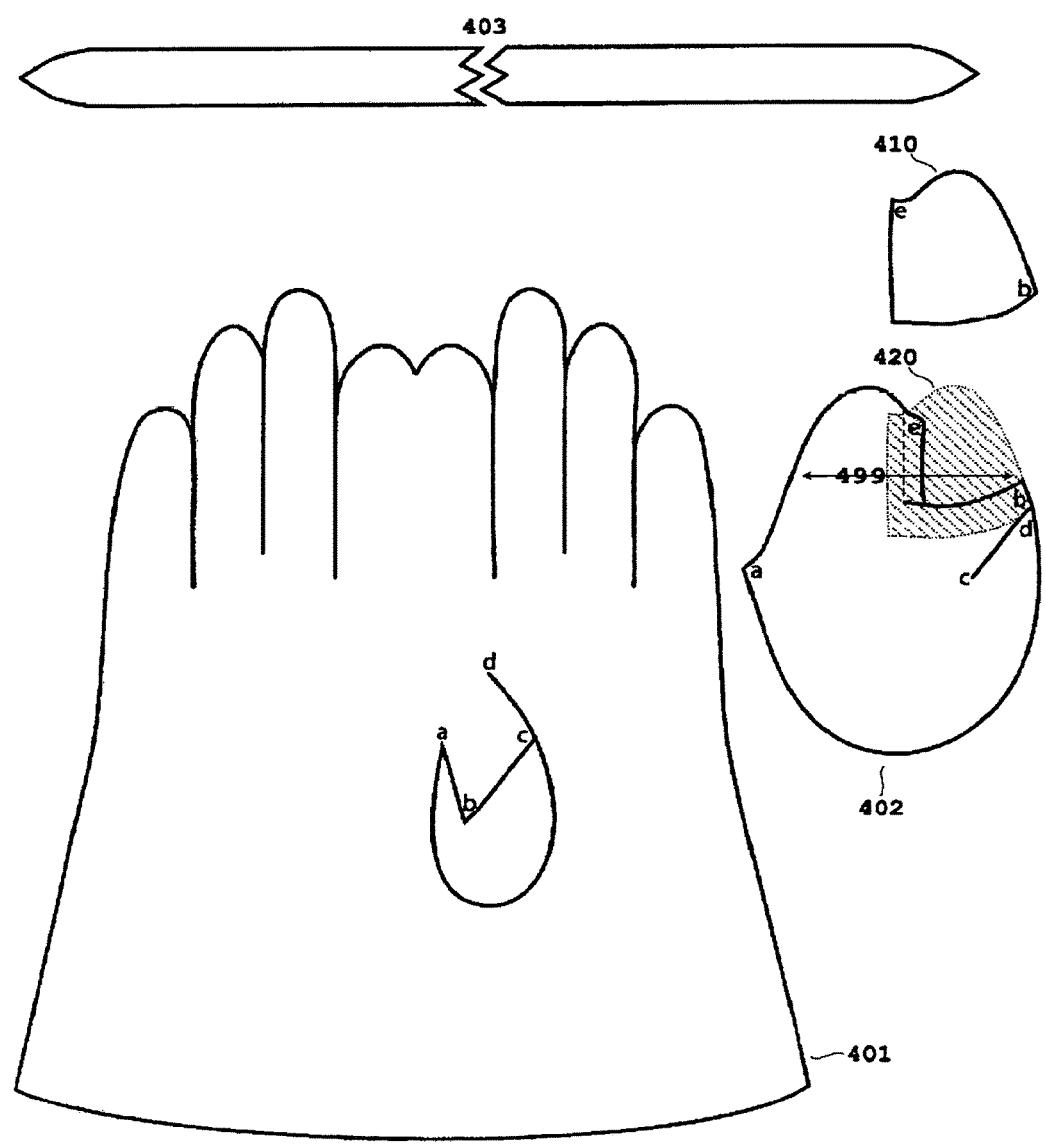
FIG. 4 is an actual glove pattern scaled to fit in page that can be used to construct alternate embodiment of the invention

FIG. 4 shows a glove pattern with a secondary open finger sheath constructed with pattern piece 410. Pattern piece 410 is attached in the orientation indicated by the dotted cross hatch 420. Pattern piece 410 is to be place on the internal face of pattern piece 402 then stitched or glued with adhesive as indicated by the dash line within the dotted cross hatch 420, then the remaining parts can be assemble together observing the notches. The pattern piece strip 403 has been truncated to fit on page, the actual length of the strip 403 must be sufficient to cover the perimeter of the 3 cuts between adjacent fingers and 3 finger tips. Note that the patterns of FIG. 3 and FIG. 4 are of the same style and some parts are interchangeable such as the thumb parts.

Figure 5:
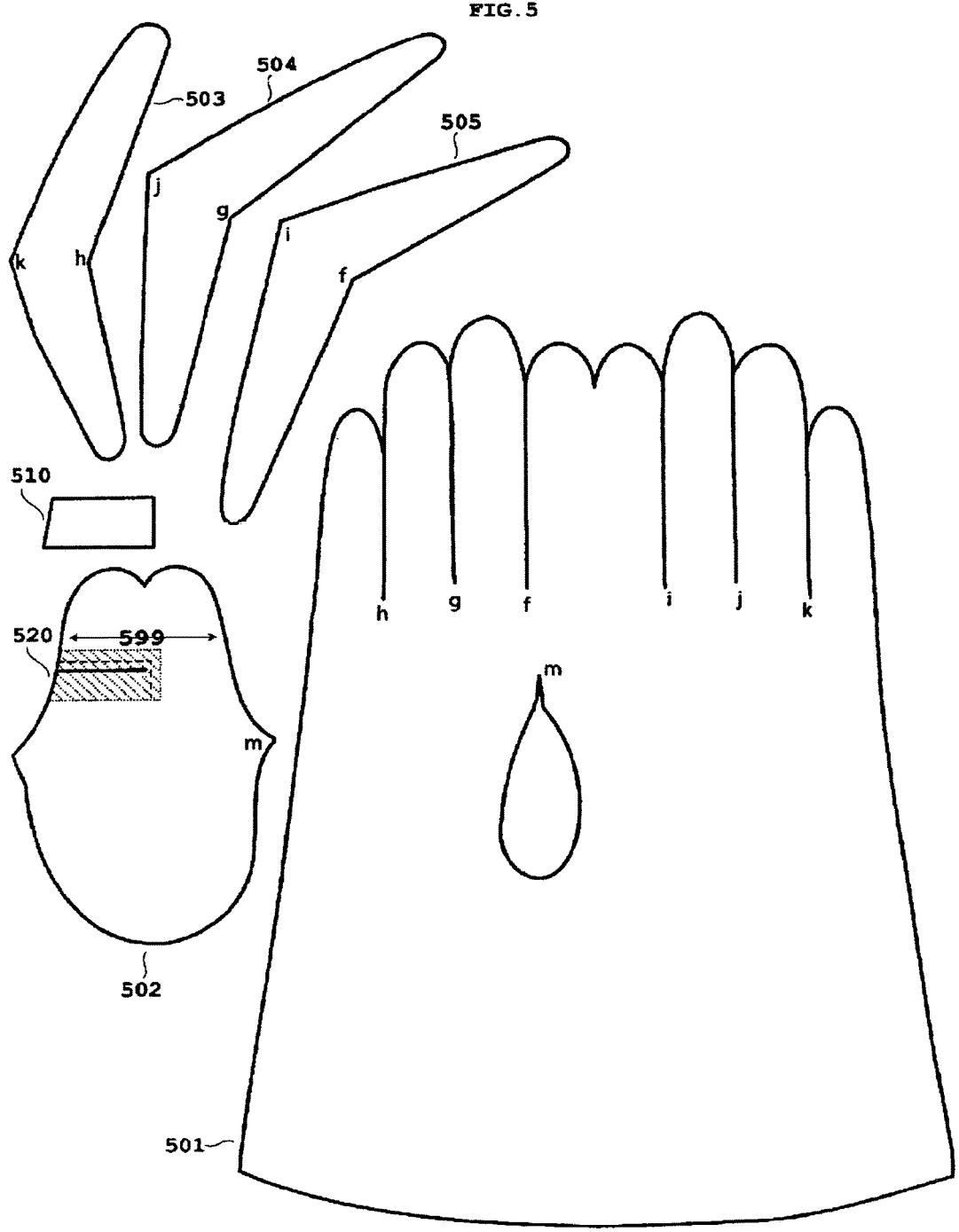
FIG. 5 is an actual glove pattern scaled to fit in page that can be used to construct alternate embodiment of the invention

FIG. 5 shows a glove pattern with a peripheral open finger sheath constructed with pattern piece 510. Pattern piece 510 is attached in the position indicated by the dotted cross hatch 520. Pattern piece 510 is to be place on the internal face of pattern piece 502 then stitched or glued with adhesive as indicated by the dash line within the dotted cross hatch 520, then the remaining parts can be assemble together by matching the notch letters. Furthermore it is possible to create a seal between the overlap section form by pattern piece 510 and pattern piece 502 by using low profile Velcro@ (hook 845 or hook 833) for the inner surface faces to form a temporary seal.

Figure 6:
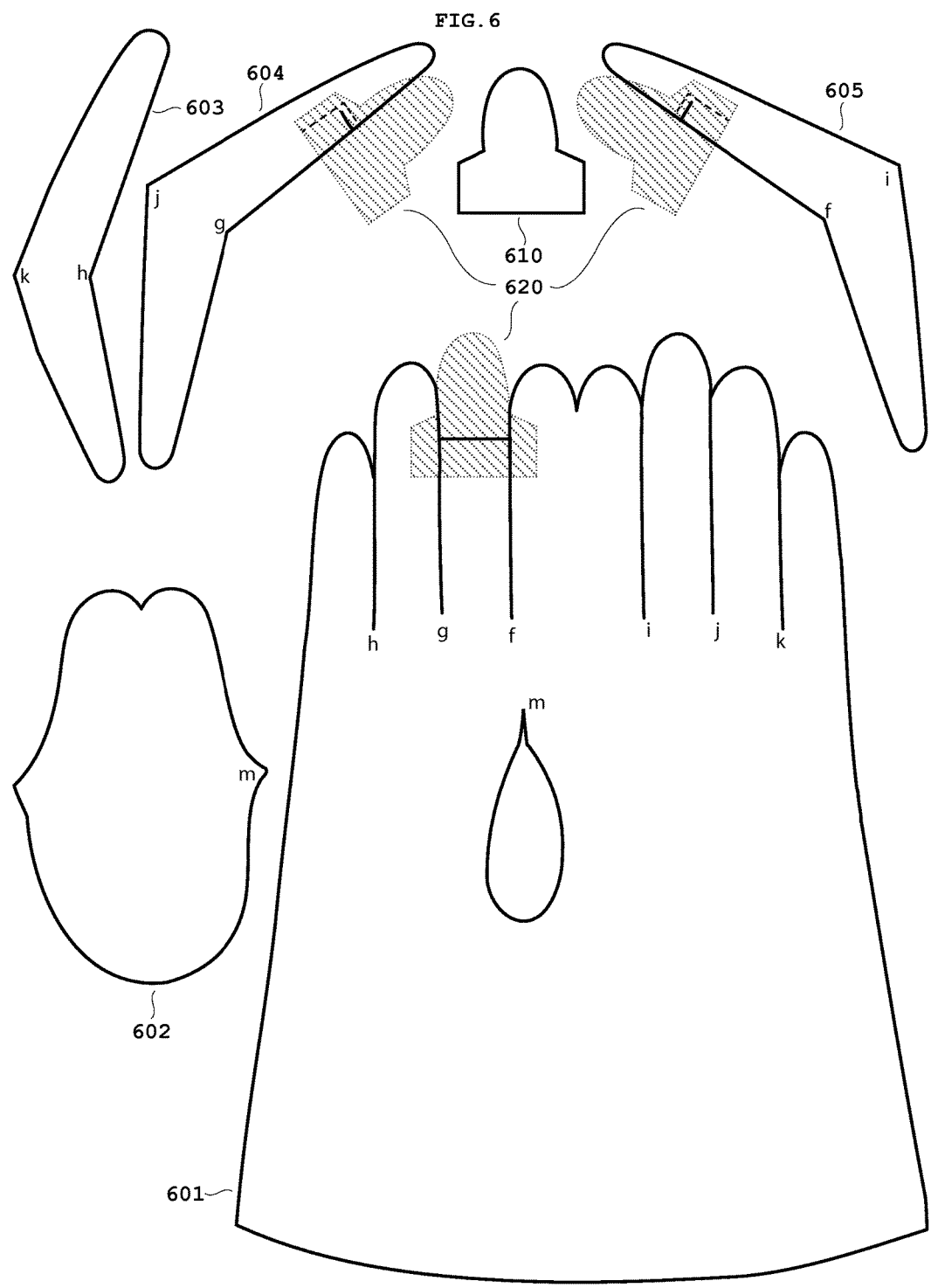
FIG. 6 is an actual glove pattern scaled to fit in page that can be used to construct alternate embodiment of the invention

FIG. 6 shows a glove pattern with a secondary open-ended finger compartment. Pattern piece 604 and pattern piece 605 are first arranged (matching the notches) and attached to the palm face (side with thumb opening) of pattern piece 601 in their respective positions to form 3 walls of a finger compartment. then pattern piece 610 is place on the internal face at the tip end of the finger compartment in the position indicated by the dotted cross hatch 620 relative to pattern piece 601 and attached by stitching close the curved perimeter parts of the tips of both pattern piece 604 and pattern piece 605 to pattern piece 610, then the 2 side flaps of pattern piece 610 can be stitched or glued with adhesive as indicated by the dash lines within the dotted cross hatch 620 of both pattern piece 604 and pattern piece 605 respectively, finally the remaining parts can be assemble together. Note that the patterns of FIG. 5 and FIG. 6 are of the same style and some parts are interchangeable such as the thumb parts.

Figure 7:
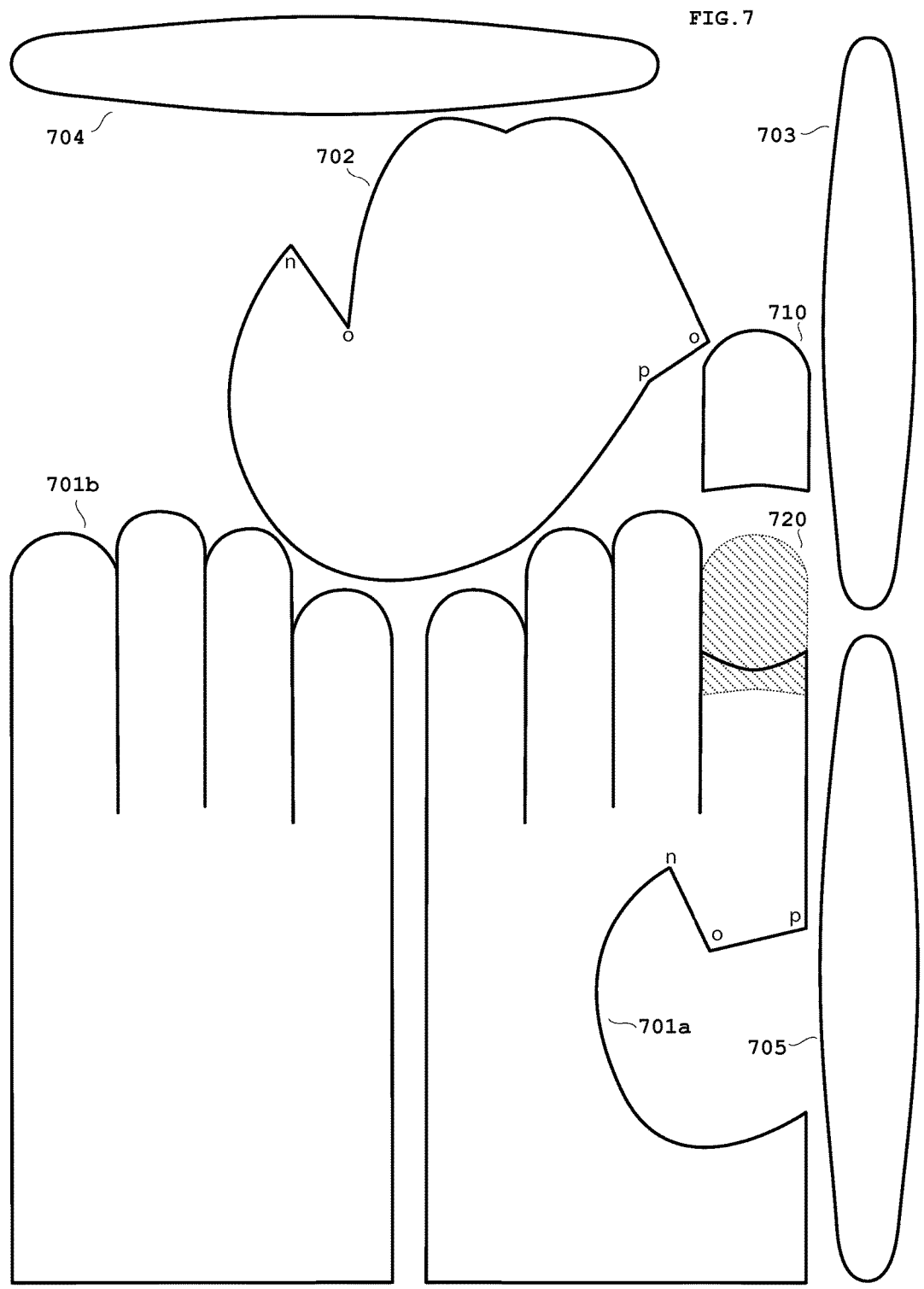
FIG. 7 is an actual glove pattern scaled to fit in page that can be used to construct alternate embodiment of the invention

FIG. 7 shows a glove pattern with a secondary open-ended finger compartment constructed with pattern piece 710. Pattern piece 710 is attached in the position indicated by the dotted cross hatch 720. Pattern piece 710 is to be place on the internal face of pattern piece 701a and then both attached with pattern piece 701b on the common outside edge (matching up the fingers). Then both pattern pieces 710 and 701a are attach to pattern piece 705 on the common inside edge of pattern pieces 710 and 701a. Finally the remaining parts can be assemble together noting the notches and matching the length of the pattern pieces' edges. The pattern pieces of FIG. 7 are for a looser fitting glove and can allow for addition plies of material to provide for better insulation denoted by 223 in the exploded cross section of FIG. 2.

Figure 8:
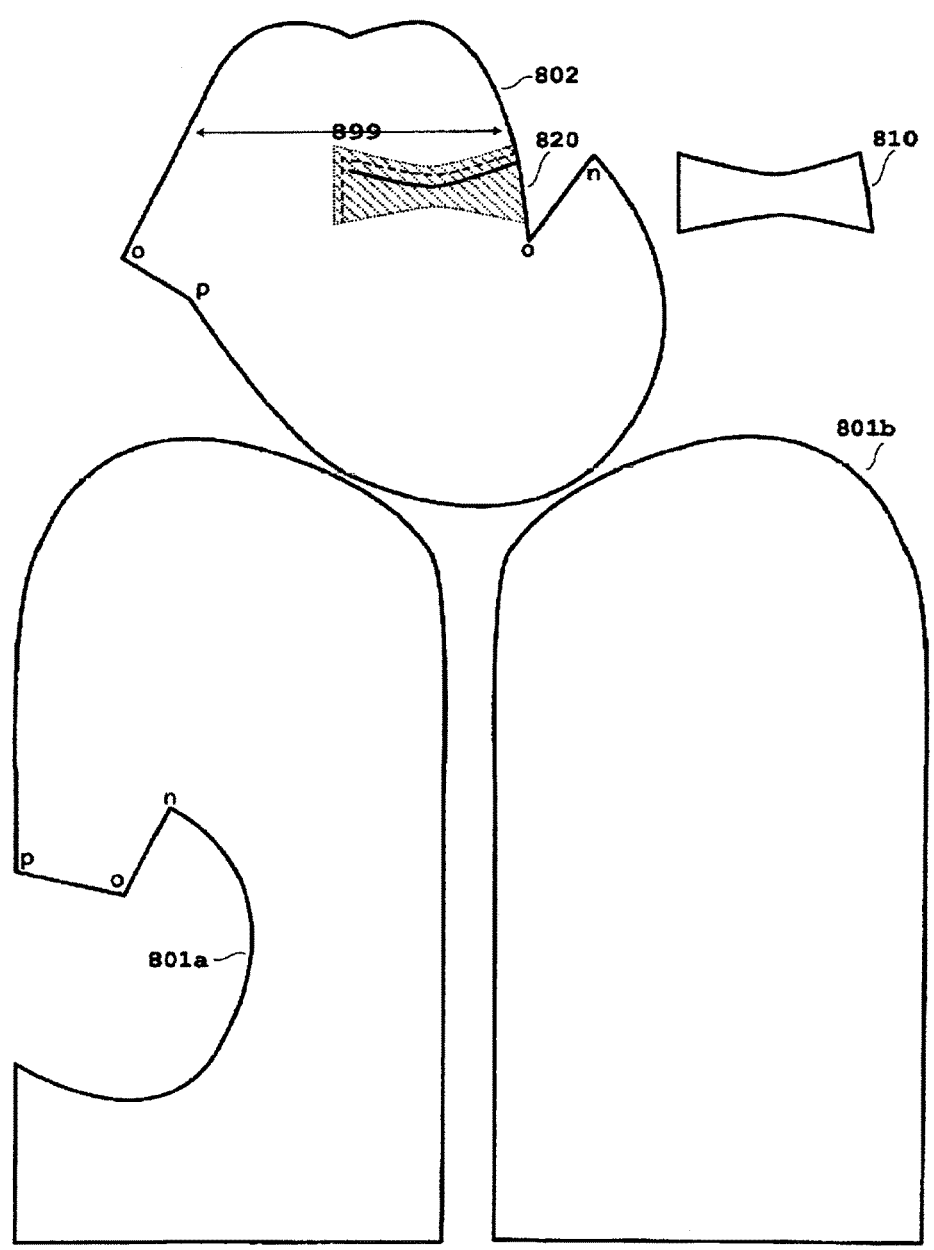
FIG. 8 is an actual glove pattern scaled to fit in page that can be used to construct alternate embodiment of the invention FIG. 9 are illustrations of low profile hooks made by Velcro
Figure 9:
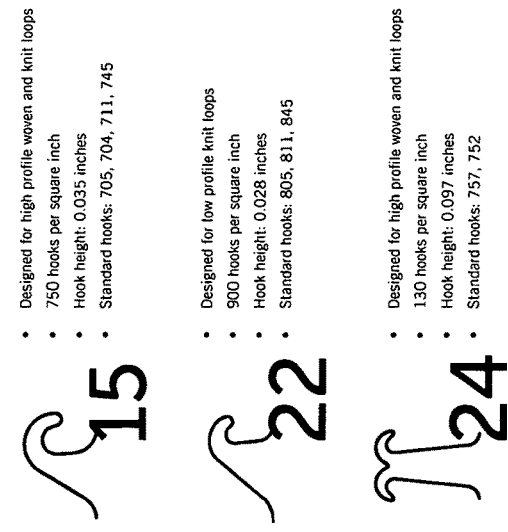

FIG. 8 shows a glove pattern with a mitten for 4 fingers and a close-ended finger sheath for the thumb, with a peripheral unclose-ended finger sheath constructed with pattern piece 810. Pattern piece 810 is attached in the position indicated by the dotted cross hatch 820. Pattern piece 810 is to be place on the internal face of pattern piece 802 then stitched or glued with adhesive as indicated by the dash line within the dotted cross hatch 820, then the remaining parts can be assemble together. The pattern piece of FIG. 8 are of a looser fitting glove. Furthermore the edge of the peripheral open-ended finger sheath can be finished by attaching piping or other material or just simply folding over the edge and stitching. Additionally pattern piece 810 can be made of a more elastic material to allow for a narrower opening that can expand in conjunction with the curve of the opening to fit a bigger finger.

In each embodiment the user would wear the glove as normal, and when the user needs to interact with a touch interface device the user would tug on the glove tip retracting his finger from the closed tip and using his finger tip to poke through the secondary sheath with the unclosed tip.

For gloves constructed out of a softer material, a stiffer curved piece can be added to the inner layer in the section of overlap to retain a semi tubular shape, where by allowing a wearers finger to be inserted into the closed tip of the finger compartment and not accidentally through the opening formed by the section of two overlapping layers It will be obvious to any one skilled in the art that the present invention can be applied to knitted gloves and molded gloves to provide the same functionality. The embodiments described above are for the purposes of illustration and not of limitation.

The invention claimed is:

1. A glove comprising of a palm covering and a back covering and at least one finger sheath with a closed fingertip wherein at least one of the finger sheath with closed fingertip comprises of a second integrated parallel sheath disposed at the closed fingertip, wherein the second parallel sheath has an unclosed fingertip and extend partially a length of the finger sheath with closed fingertip, wherein the second parallel sheath sharing at least one common wall with the finger sheath with closed fingertip, wherein the second parallel sheath when distended by a finger of a wearer, the second parallel sheath exposes an uncovered fingertip of a wearer to interact with a touch interface device, wherein the second parallel sheath having a distend circumference substantially equal to that of the finger sheath with closed fingertip.

2. The glove of claim 1 wherein the palm covering and the back covering comprising of a plurality of plies of material.

* * * * *